(No Model.) 2 Sheets—Sheet 1.

M. R. WOOD.
ANTI FRICTION BEARING.

No. 378,350. Patented Feb. 21, 1888.

Witnesses
Charles E. Tetley
C. Feigel

Inventor
Milton R. Wood.
By his Attorneys (No Model.) 2 Sheets—Sheet 2.

M. R. WOOD.
ANTI FRICTION BEARING.

No. 378,350. Patented Feb. 21, 1888.

Witnesses.
Charles E. Tetley.
C. Feigel.

Inventor.
Milton R. Wood
By his Attorneys.

UNITED STATES PATENT OFFICE.

MILTON R. WOOD, OF CHICAGO, ILLINOIS.

ANTI-FRICTION BEARING.

SPECIFICATION forming part of Letters Patent No. 378,350, dated February 21, 1888.

Application filed October 19, 1887. Serial No. 252,857. (No model.)

*To all whom it may concern:*

Be it known that I, MILTON R. WOOD, a citizen of the United States, and residing at Chicago, in the county of Cook and State of Illinois, have invented a certain new and useful Improvement in Anti-Friction Bearings, which is fully set forth in the following specification, reference being had to the accompanying drawings, in which—

Figure 1:
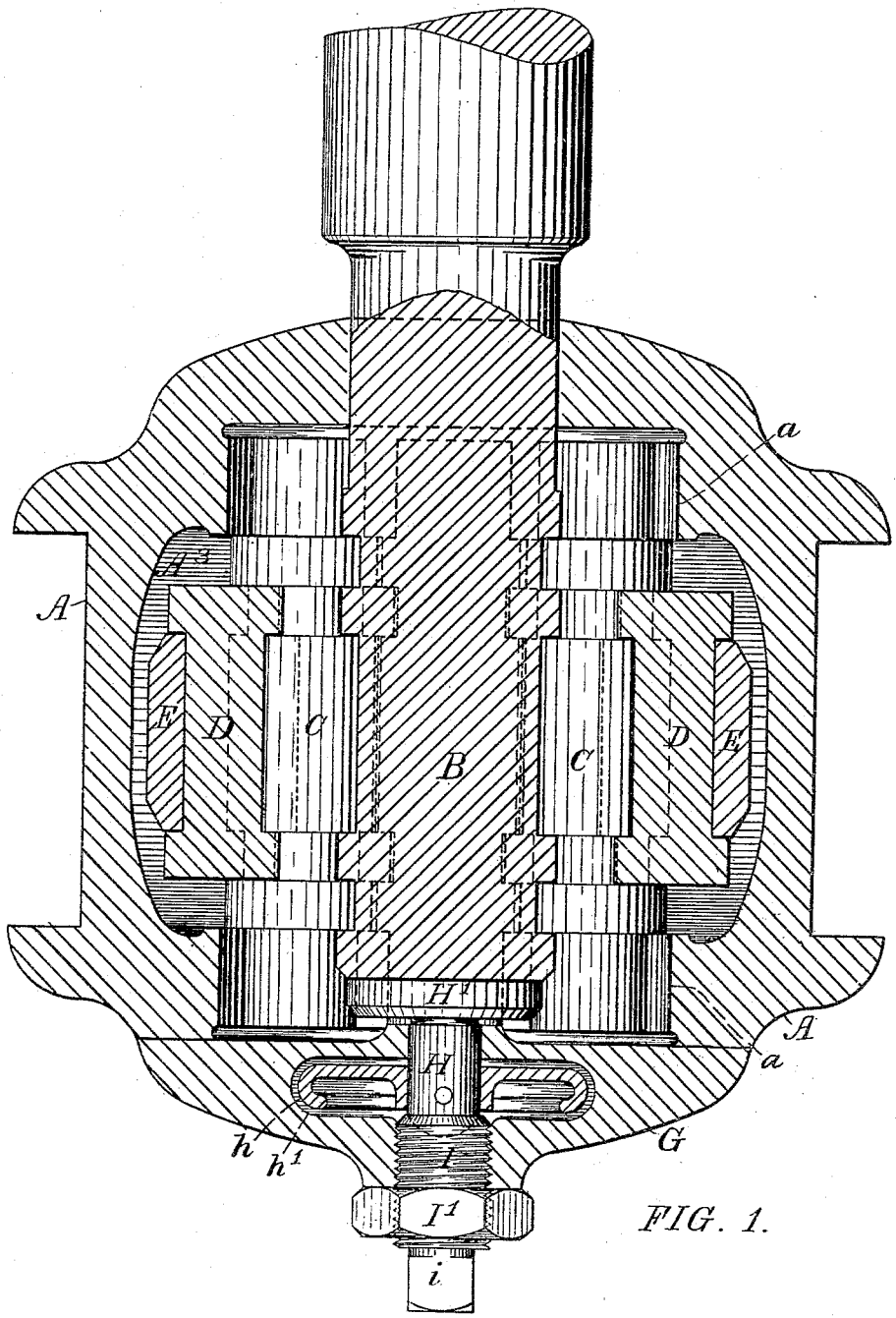
Figure 2:
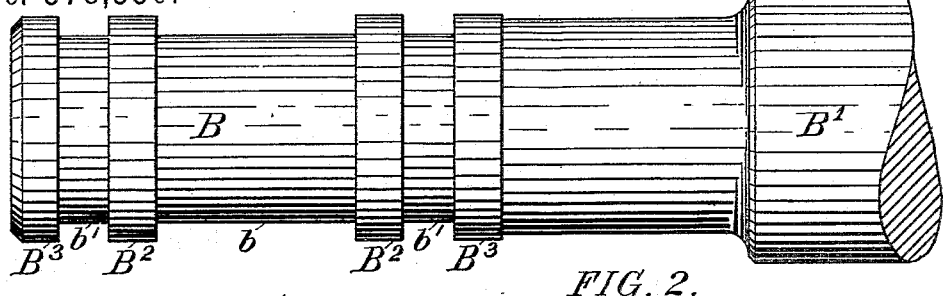
Figure 3:
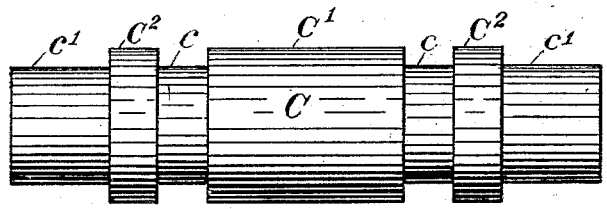
Figure 4:
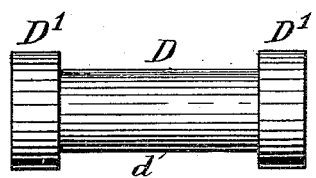
Figure 5:
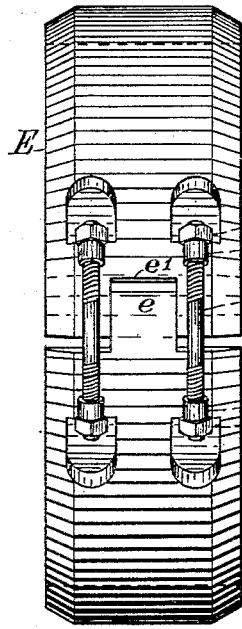

Figure 1 is a longitudinal sectional view of a bearing embodying my invention; Fig. 2, a detail view of the journal; Fig. 3, a detail view of one of the anti-friction rollers; Fig. 4, a detail view of one of the spacing-rollers; Fig. 5, a detail view of the retaining-ring, and Fig. 6 a transverse sectional view.

Like letters refer to like parts in all the figures of the drawings.

My invention relates to anti-friction bearings, and more particularly to that class in which anti-friction rollers are employed surrounding the shaft, journal, or axle, and serving to reduce the friction by substituting rolling contact for sliding contact.

The object of my present invention is to provide an anti-friction bearing of this description which shall possess various advantages of construction and operation, as will be hereinafter pointed out.

I will now proceed to describe a construction in which I have practically carried out my invention in one form, and will then particularly point out in the claims those features which I deem to be new and desire to protect by Letters Patent.

In the present instance I have shown the device as applied to the journal-box of a railway-car, in which A represents the box or housing, composed of an upper half or section, A', and a lower half or section, A², which may be secured together in any suitable manner. This box is recessed internally, as shown at A³, to receive the journal B of the axle B', the said recess being of considerably greater diameter than the journal in order to accommodate the anti-friction rollers. The journal B is provided with a central reduced portion or groove, b, of considerable width, and with a similarly-reduced portion or groove, b', at each side thereof, the said grooves being formed by means of fixed collars or enlargements B² and B³ on the said journal. The collars B² are located, as shown in Fig. 2 of the drawings, on each side of the central groove, b, and the collars B³ are arranged, respectively, on the outer sides of the grooves b'.

Around the journal B is grouped a series of anti-friction rollers, C, of which any suitable number may be employed, although I prefer to employ the number shown in the present instance—to wit, six. These rollers are each constructed in the manner shown in Fig. 3 of the drawings, and consist of a central portion, C', to fit within the groove b of the journal B, a reduced portion, c, at each side thereof to receive the collars B², collars C² on the outer sides of these reduced portions to fit within the grooves b' of the journal B, and reduced ends c', which bear upon the collars B³ and also upon suitable tracks or ways, a, formed at each end of the recess A³ in the box A.

Figure 6:
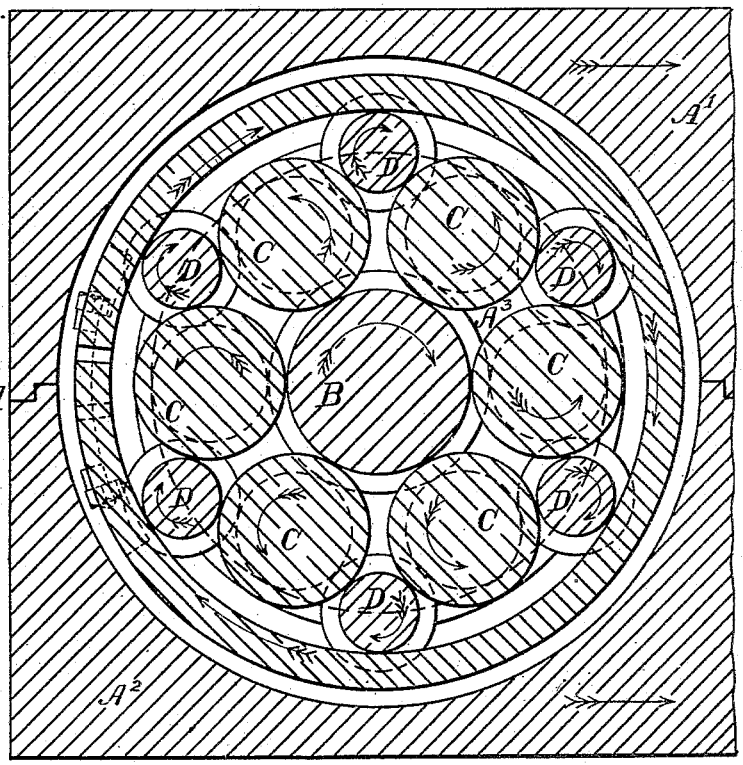

In order to prevent the anti-friction rollers C from coming in contact with each other, I employ spacing-rollers D, constructed in the manner shown in Fig. 4, and consisting of a centrally-reduced portion, d, which bears upon the enlarged portions C' of the two anti-friction rollers C, between which it is placed, and having enlarged ends D', which enter the grooves c in the said rollers C. One of these spacing-rollers is placed between each pair of anti-friction rollers, and said spacing-rollers serve, in conjunction with the retaining-ring E, to prevent contact between the said anti-friction rollers C. The retaining-ring E is of such width as to just fit the reduced portion d of the spacing-rollers D, the enlarged end portions, D', of said spacing-rollers projecting outward on each side of the ring, as shown in Fig. 1, and thereby preventing lateral displacement of the ring. The recess A³ is enlarged centrally, as shown in Figs. 1 and 6, so that the spacing-rollers and retaining-ring shall not come in contact with the journal-box A at any point.

In order to provide for the assembling of the parts, I make the retaining-ring E a divided ring, one of the meeting ends being provided with a tongue, e, which enters a corresponding recess, e', in the other end, whereby lateral displacement of the parts is prevented. The ends of the ring E are connected by means of threaded rods F, which pass through fixed bearings f, and are provided at their ends with nuts F', by means of which the ring may be tightened up to take up any wear which may occur in the parts. The ring will in practice have sufficient elasticity to permit of its being opened sufficiently to insert the last spacing-roller D in order to permit the parts to be assembled.

The operation of the device is as follows: The journal B rotating in the direction of the arrow thereon, the anti-friction rollers C will move around the same in the direction indicated by their arrows, traveling upon the tracks a and acting to reduce the friction to a minimum by reason of the fact that no sliding contact exists at any point. The spacing-rollers D serve to prevent the anti-friction rollers from coming in contact with each other, and thereby causing a sliding friction, which would tend to pulverize the said rollers and render the device useless. The ring E serves in an obvious manner to hold the spacing-rollers in position, and moves in the direction of the arrow shown thereon. By means of this retaining-ring any slight wear which may occur in course of time may be readily taken up in an obvious manner.

In order to provide for the end-thrust of the axle, I employ for the outer end of the journal-box A a cap, G, secured thereto in any suitable manner, and having mounted centrally therein a short shaft, H, provided at its inner end with a disk, H', which bears against the end of the journal B, as shown in Fig. 1. This shaft is capable of a limited longitudinal play within its bearing, and its outer end, which is spherical, fits within a similarly-shaped concave recess in the inner end of a screw-bolt, I, which extends outward through the cap, and is provided with a wrench-grasp, i, by means of which it may be rotated. A lock-nut, I', is mounted on the screw-bolt I on the outer end thereof, as shown. The shaft H is provided with a wheel, h, which runs within a recess, h', in the cap G, said recess being filled with oil or other suitable lubricant, which the wheel serves to carry to the bearings of the shaft H. The disk H' serves in an obvious manner to prevent end friction of the journal, since it will rotate along with the same when in contact with it, and the screw-bolt I serves to take up any wear at this point, and also to adjust the shaft H and disk H' to their desired position.

It is obvious that various modifications in the details of construction and arrangement of the parts may be made without departing from the principle of my invention, and I therefore do not wish to be understood as limiting myself strictly to the precise details hereinbefore described, and shown in the drawings.

Having thus described my invention, what I claim as new, and desire to secure by Letters Patent, is—

1. The combination, with the inclosing-box or housing provided with tracks near each end, of the shaft or journal provided with reduced portions and intermediate collars, a series of anti-friction rollers provided with collars to fit within the reduced portions and with grooves to receive the collars of the shaft or journal, said anti-friction rollers having reduced ends which travel upon the ways of the box or housing, spacing-rollers provided with a reduced central portion and with enlarged ends to enter the grooves in the anti-friction rollers, and a retaining-ring to fit upon the reduced portions of the spacing-rollers and hold the same in position, substantially as and for the purposes specified.

2. The combination, with the shaft or journal and the inclosing-box or housing, of anti-friction rollers arranged between the two, spacing-rollers for separating the anti-friction rollers, and a divided retaining-ring provided with means for tightening the same to take up wear, substantially as and for the purposes specified.

3. The combination, with the shaft or journal and its anti-friction and spacing rollers, of the retaining-ring E, provided with tongue e and recess e', the bearings f, mounted on the ends of said ring, and the threaded rods F, provided with nuts F', substantially as and for the purposes specified.

4. The combination, with the journal B, the inclosing-box, and the cap G, provided with the oil-chamber h', of the shaft H, provided at one end with the disk H', to bear against the end of the journal, rounded or convex at the other end, and carrying the wheel h, and the screw-bolt I, recessed to receive the end of the shaft H and provided with a lock-nut, I', substantially as and for the purposes specified.

MILTON R. WOOD.

Witnesses:
CARRIE FEIGEL,
IRVINE MILLER.